(12) United States Patent
Jones et al.

(10) Patent No.: US 6,855,033 B2
(45) Date of Patent: Feb. 15, 2005

(54) FIXTURE FOR CLAMPING A GAS TURBINE COMPONENT BLANK AND ITS USE IN SHAPING THE GAS TURBINE COMPONENT BLANK

(75) Inventors: Daniel Edward Jones, Batavia, OH (US); Jacques Juneau, Jr., Amelia, OH (US)

(73) Assignee: General Electric Company, NY (US)

( * ) Notice: Subject to any disclaimer, the term of this patent is extended or adjusted under 35 U.S.C. 154(b) by 393 days.

(21) Appl. No.: 10/015,257

(22) Filed: Dec. 13, 2001

(65) Prior Publication Data

US 2003/0114080 A1 Jun. 19, 2003

(51) Int. Cl.[7] ................................................ B24B 1/00
(52) U.S. Cl. .......................... 451/28; 451/49; 451/54; 451/55; 451/64; 451/365; 451/406; 451/460; 269/32; 269/238
(58) Field of Search .............................. 451/28, 49, 54, 451/55, 64, 365, 406, 408, 460; 269/32, 238

(56) References Cited

U.S. PATENT DOCUMENTS

| | | | |
|---|---|---|---|
| 3,331,166 A | * | 7/1967 | Brenning .................... 451/365 |
| 3,818,646 A | | 6/1974 | Peterson |
| 4,638,602 A | | 1/1987 | Cavalieri |
| 4,805,351 A | | 2/1989 | Dobson et al. |
| 4,829,720 A | * | 5/1989 | Cavalieri .................... 451/365 |
| 6,017,263 A | | 1/2000 | Dwyer |
| 6,139,412 A | | 10/2000 | Dwyer |
| 6,287,182 B1 | | 9/2001 | Dwyer |

* cited by examiner

Primary Examiner—Joseph J. Hail, III
Assistant Examiner—Alvin J. Grant
(74) Attorney, Agent, or Firm—McNees Wallace & Nurick LLC

(57) ABSTRACT

A gas turbine component blank is shaped by clamping the gas turbine component blank into a fixture that accurately positions the gas turbine component blank in three dimensions. The positioning is accomplished against stops accurately machined into a base of the fixture, by first supporting the gas turbine component blank on one set of stops that prevents movement in the direction perpendicular to a plane of the base, and then operating a movable clamp to force the gas turbine component blank against other sets of stops that limit the movement of the gas turbine component blank in directions lying in the base plane. The clamp has a compound movement that simultaneously forces the gas turbine component blank against stops that prevent movement in orthogonal directions lying in the base plane. The gas turbine component blank is thereafter shaped, preferably by grinding the sides of the root precursor of the gas turbine component blank.

26 Claims, 7 Drawing Sheets

FIXTURE FOR CLAMPING A GAS TURBINE COMPONENT BLANK AND ITS USE IN SHAPING THE GAS TURBINE COMPONENT BLANK

This invention relates to fixturing to support a gas turbine component blank, and more specifically, to clamping the gas turbine component blank in the fixture and shaping the root of the gas turbine component blank.

BACKGROUND OF THE INVENTION

In the most commonly practiced approach, turbine blades for gas turbine engines are cast to approximately the final shape. Then portions of the turbine blade, such as the root and the shroud, if any, are shaped to the final desired form by a technique such as grinding. The turbine blade is thereafter processed by depositing protective coatings or by other procedures.

The finished turbine blades are assembled into a turbine disk or wheel, with a "dovetail" form on the root of each turbine blade engaging a respective conformably shaped slot on the turbine disk. The turbine disk is in turn supported on a shaft in the gas turbine engine. The turbine blades must have precisely established positions and angular orientations in the turbine disk. Any mispositioning and misorientation may lead to aerodynamic inefficiency and the introduction of unacceptable vibrations in the turbine disk and the turbine blade as the turbine disk turns during service.

Because it is the root of each turbine blade that engages the slot on the turbine disk, the root must be shaped very precisely. Two techniques have been widely used to hold the turbine blade in an exact location and orientation for the shaping of the root. In one, the airfoil of the turbine blade is cast into a matrix of a metal with a low melting point, which is used to hold the turbine blade with its root precursor positioned for grinding or other shaping. This approach, while operable, requires that the low-melting-point metal be cleaned from the surface of the airfoil after the shaping of the root is completed. Even traces of the metal remaining after careful cleaning of the surface of the airfoil may adversely affect the subsequent application of the coatings. Mechanical fixtures or jigs have been developed to hold the turbine blade. These fixtures avoid the use of the low-melting-point metal, but have not been fully satisfactory because they misposition the root precursor or because they do not hold the turbine blades sufficiently repeatably and securely so that each root is shaped the same.

There is a need for an improved approach to the shaping of the roots of turbine blades and other gas turbine components. The present invention fulfills this need, and further provides related advantages.

SUMMARY OF THE INVENTION

The present invention provides a fixture for holding a gas turbine component blank, such as a turbine blade, a compressor blade, or some types of vanes, in a specific fixed position for the shaping of the gas turbine component blank, and a method for performing the shaping. The approach does not use a molten metal whose complete removal is difficult. The fixture holds the gas turbine component blank using features of the gas turbine component blank whose positions are precisely defined. This approach allows each gas turbine component blank to be processed precisely, quickly, securely, reproducibly, without contamination, and with minimal dependence upon operator skill.

A fixture is provided for clamping a gas turbine component blank that is to be shaped into a corresponding gas turbine component. The gas turbine component blank comprises an airfoil having a direction of elongation, and a platform extending transversely to the airfoil and having a top side adjacent to the airfoil and a bottom side oppositely disposed from the top side. The gas turbine blank includes a root precursor at the first end of the airfoil and extending away from the airfoil, wherein the root precursor has a pair of oppositely disposed parallel ends, and a pair of sides which are to be shaped into a dovetail form. There is a rotating shroud located at a second end of the airfoil and extending transversely to the airfoil.

The fixture is used in conjunction with this gas turbine component blank. The fixture comprises a base lying in a base plane and having a datum locator. The datum locator includes an x-axis datum locator upon which the gas turbine component blank is supported so that the direction of elongation of the airfoil is generally parallel to the base plane. The x-axis datum locator prevents movement of the gas turbine component blank perpendicular to the base plane. A y-axis datum locator comprises a first y-axis stop and a second y-axis stop, wherein the first y-axis stop is contacted by a first one of the ends of the root precursor and the second y-axis stop is contacted by the rotating shroud. A z-axis datum locator is contacted by the gas turbine component blank and prevents movement of the gas turbine component blank parallel to the direction of elongation of the airfoil. The fixture further includes a clamp movable between an unclamped position in which the gas turbine component blank may be inserted onto the x-axis datum locator of the base, and a clamped position wherein the clamp simultaneously forces the first end of the root precursor against the first y-axis stop, the rotating shroud against the second y-axis stop, and the gas turbine component blank against the z-axis datum locator.

The clamp preferably comprises a compound mechanical movement that simultaneously forces the gas turbine component blank against the y-axis datum locator and the z-axis datum locator when the clamp is moved from the unclamped position to the clamped position. Most preferably, the clamp comprises a first link pivotably connected to the base and contacting to the root precursor and to the platform when the clamp is in the clamped position, so as to force the first end of the root precursor against the first y-axis stop and to force the platform against the z-axis datum locator, and a second link pivotably connected to the base and contacting to the rotating shroud when the clamp is in the clamped position, so as to force the rotating shroud against the second y-axis stop, the first link having a sliding and pivoting interconnection to the second link. The first link desirably includes a z-positioning spring contacting the bottom side of the platform when the clamp is in the clamped position to force the top side of the platform against the z-axis datum locator. The sliding and pivoting interconnection is preferably a mechanical knuckle. An hydraulic actuator is operable to move the clamp between the unclamped position and the clamped position.

Stated alternatively, a fixture is provided for clamping a gas turbine component blank having an airfoil, a root precursor at a first end of the airfoil, and a rotating shroud at a second end of the airfoil. The fixture comprises a base lying in a base plane and having a datum locator. The datum locator includes an x-axis datum locator upon which the gas turbine component blank is supported to prevent movement of the gas turbine component blank perpendicular to the base plane. A y-axis datum locator comprises a first y-axis stop and a second y-axis stop, with the y-axis datum locator preventing movement of the gas turbine component blank in a first direction lying in the base plane. A z-axis datum locator prevents movement of the gas turbine component blank in a second direction orthogonal to the first direction and lying in the base plane. A clamp is movable between an unclamped position in which the gas turbine component blank may be inserted onto the x-axis datum locator of the base, and a clamped position wherein the clamp simultaneously forces the root precursor against the first y-axis stop, the rotating shroud against the second y-axis stop, and the gas turbine component blank against the z-axis stop. Various modifications and preferred forms as discussed above may be used with this embodiment.

A method for shaping a gas turbine component blank comprises the steps of providing the gas turbine component blank and fixture as discussed, thereafter placing the gas turbine component blank into the fixture with the clamp in the unclamped position, thereafter operating the clamp to move the clamp to the clamped position, and thereafter shaping the gas turbine component blank. The step of shaping preferably includes the step of shaping the sides of the root precursor into the dovetail form, most preferably by grinding.

After the gas turbine component blank is cast and cleaned, the root precursor must be shaped on both its lateral sides, termed the pressure surfaces, and on its end remote from the airfoil, termed the tang. The present fixture may be used to hold the gas turbine component blank for the shaping of the pressure surfaces, while is performed first, and another fixture is used to hold the gas turbine component blank for the shaping of the tang and the final shaping of the end of the root precursor. The present approach provides a convenient fixturing approach which avoids the use of molten metal and also ensures that the gas turbine component blank is properly and securely positioned for shaping of the root precursor, particularly the pressure surfaces of the root precursor.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
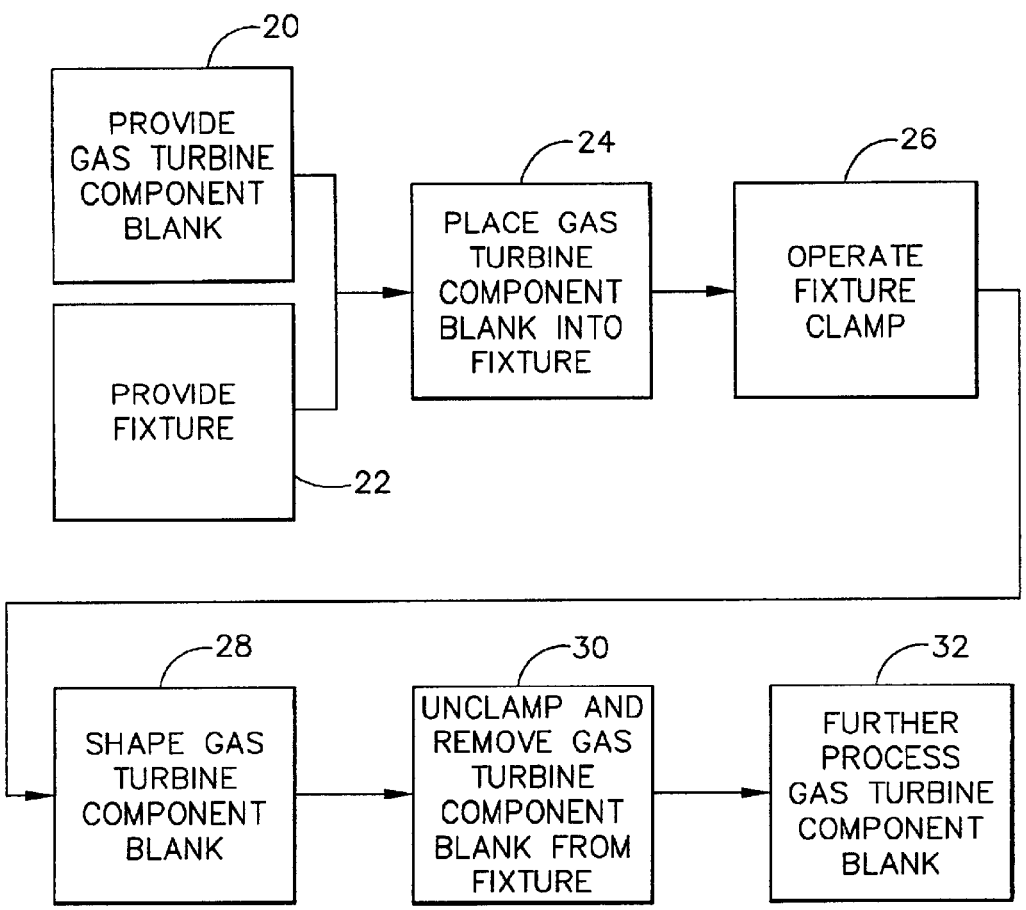
FIG. 1 is a block flow diagram of an approach for practicing the invention.
Figure 2:
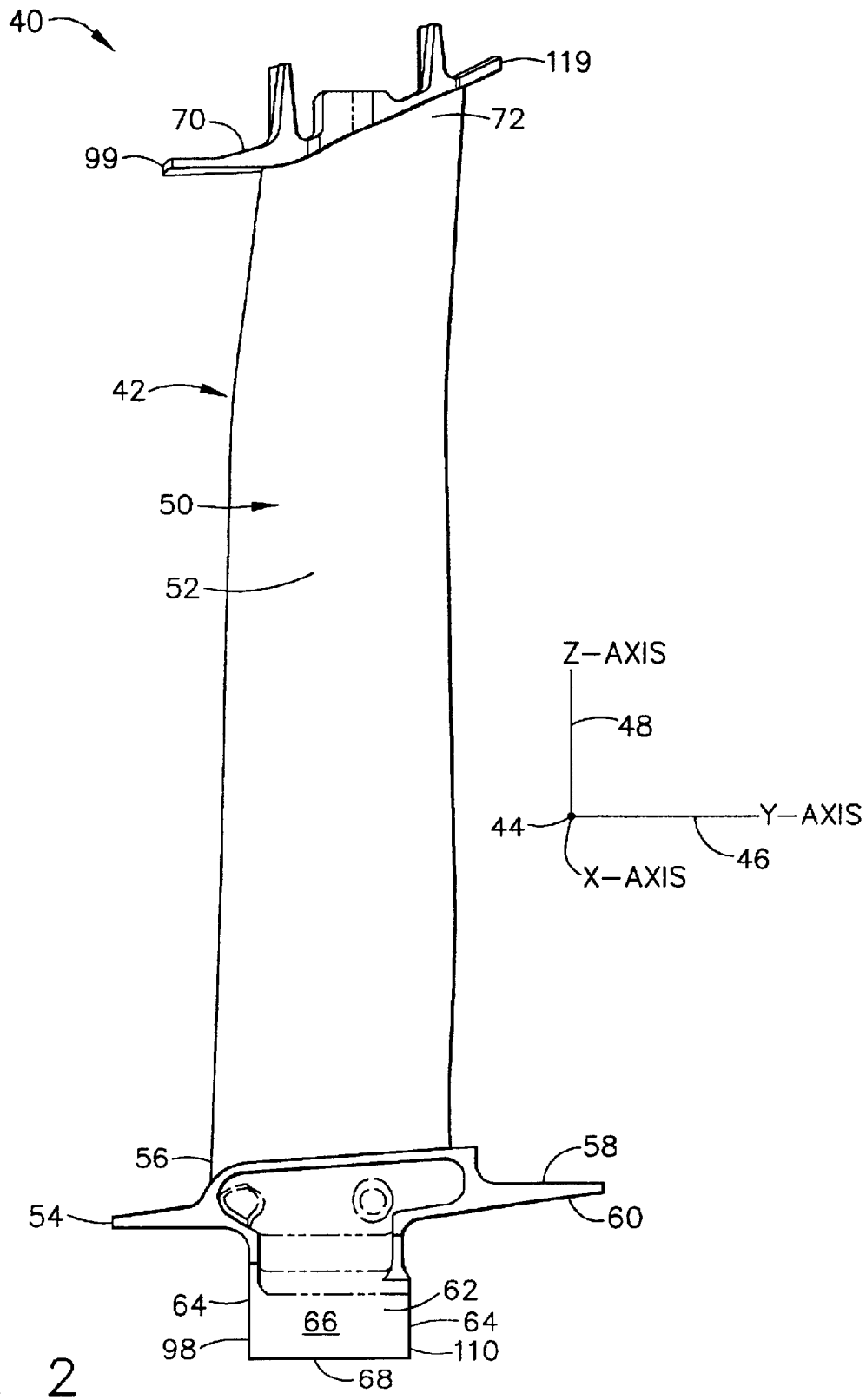
FIG. 2 is an elevational view of a turbine blade.
Figure 3:
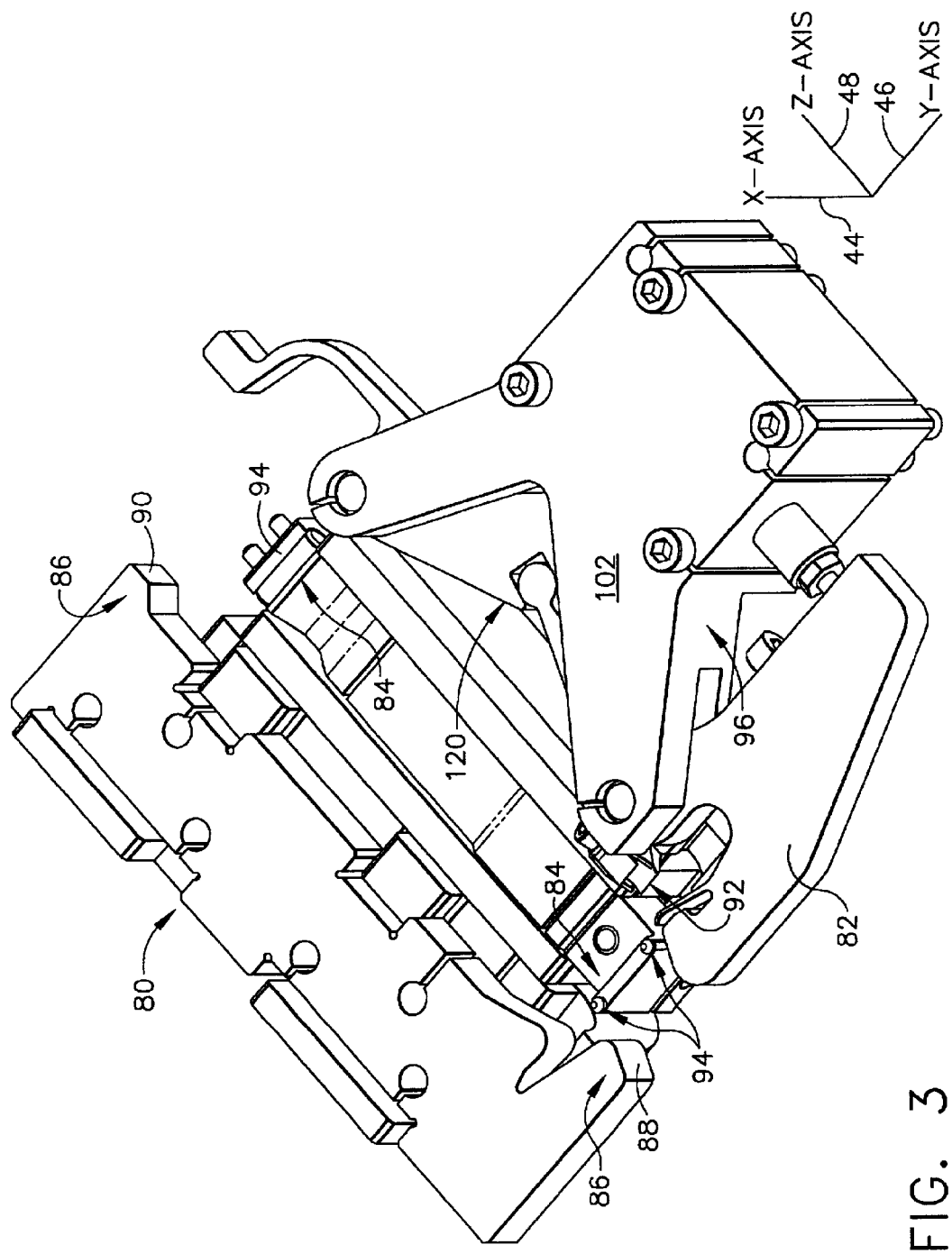
FIG. 3 is a top perspective view of a fixture in which the turbine blade is held for grinding, but without the turbine blade present.

FIG. 1 depicts a method for processing a gas turbine component blank. The gas turbine component blank is provided, numeral 20. Referring to FIG. 2, a preferred form of the gas turbine component blank 40 is a turbine blade blank 42 that is processed into a turbine blade. The articles are referred to as "blanks" because they are furnished in a cast and cleaned form that must be given a final shaping, usually by grinding, to achieve the final required shape, and are thereafter final processed. Other gas turbine components such as compressor blades and vanes may, in appropriate cases, be processed according to the approach of FIG. 1 as well.

The turbine blade blank 42 is described in relation to an orthogonal reference system including an x-axis 44, a y-axis 46, and a z-axis 48. The turbine blade blank 42 includes an elongated airfoil 50 extending generally parallel to the z-axis 48 and having an airfoil face 52. A platform 54 extends transversely to the z-axis 48 at a first end 56 of the airfoil 50. The platform 54 has a top side 58 adjacent to the airfoil 50 and a bottom side 60 oppositely disposed from the top side 56. A root precursor 62 is at the first end 56 of the airfoil 50 and extends away from the airfoil 50 along the z-axis 48. The root precursor 62 has a pair of oppositely disposed parallel ends 64 lying perpendicular to the y-axis 46, a pair of sides 66 (only one of which is visible in FIG. 2) which are to be shaped into a dovetail form, and a tang 68 at an end of the turbine blade blank 42 remote from the airfoil 50. A rotating shroud 70 is at a second end 72 of the airfoil 50, remote from the first end 56. The rotating shroud 70 generally extends transversely to the z-axis 48 and along the y-axis 46. The rotating shroud 70 is fixed in relation to the airfoil 50, and is cast integrally with the airfoil 50. The shroud is termed a "rotating shroud" not because it rotates relative to the airfoil 50, but because it rotates with the remainder of the turbine blade about the shaft of the gas turbine engine. The rotating shroud is contrasted to a stationary shroud that is found in the gas turbine engine but is not a part of the turbine blade.

A fixture 80 is provided to clamp and hold the gas turbine component blank 40 during subsequent processing, numeral 22. A preferred form of the fixture 80 is illustrated in FIGS. 3–7, with and without the gas turbine component blank 40 present. The fixture 80 includes a base 82 that lies generally in a base plane containing the y-axis 46 and the z-axis 48. The remainder of the fixture 80 is affixed to and supported on the base 82. The base 82 has an x-axis datum locator 84, a y-axis datum locator 86 including a first y-axis stop 88 and a second y-axis stop 90, and a z-axis datum locator 92. As used herein, a "datum locator" is a feature of the base 82 that serves as a positioning and fixed locating stop and against which the gas turbine component blank 40 is pushed and held fixed by the clamping structure to be discussed subsequently. The datum locators 84, 86, and 92 are preferably precisely located supports, surfaces, or shoulders machined into the base 82. Hard inserts may be affixed to the surfaces of the datum locators that are contacted by the gas turbine component blank 40 to avoid excessive wear of the datum locators. The x-axis datum locator 84 includes several, and typically at least three, x-axis stops 94 that are positioned to receive the gas turbine component blank 40 thereon with one side of the airfoil face 52 in a general facing relationship to the base 82

The fixture 80 further includes a clamp 96 (FIG. 4) movable between an unclamped position (FIG. 5) in which the gas turbine component blank 40 may be inserted onto the x-axis datum locator 84 of the base 82, and a clamped position (FIG. 6) wherein the clamp simultaneously forces a first end 98 of the root precursor 62 against the first y-axis stop 88, a first end 99 of the rotating shroud 70 against the second y-axis stop 90, and some part of the gas turbine component blank 40, preferably the top side 58 of the platform 54, against the z-axis datum locator 92.

Figure 4:
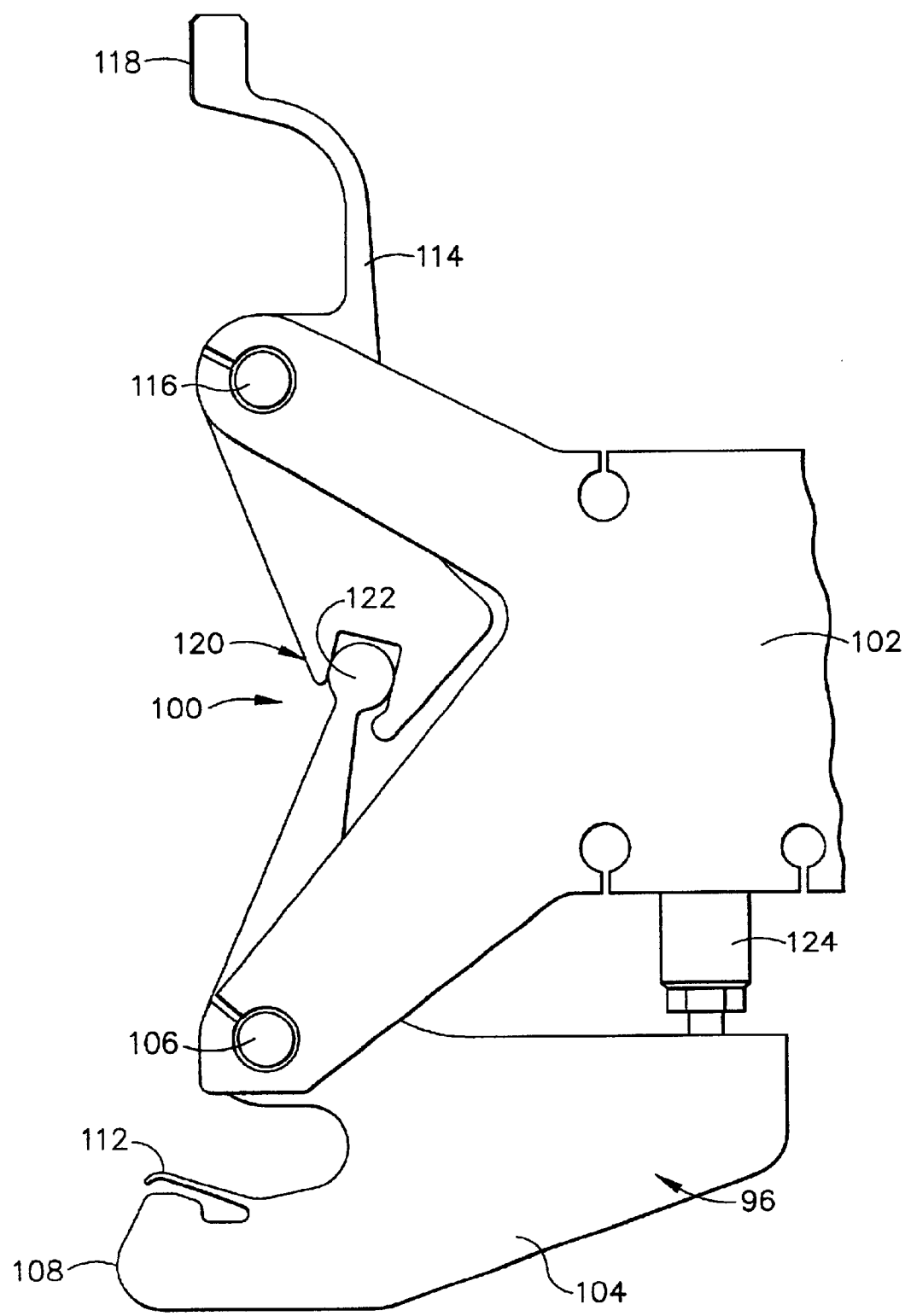
FIG. 4 is a top view of the clamp.
Figure 5:
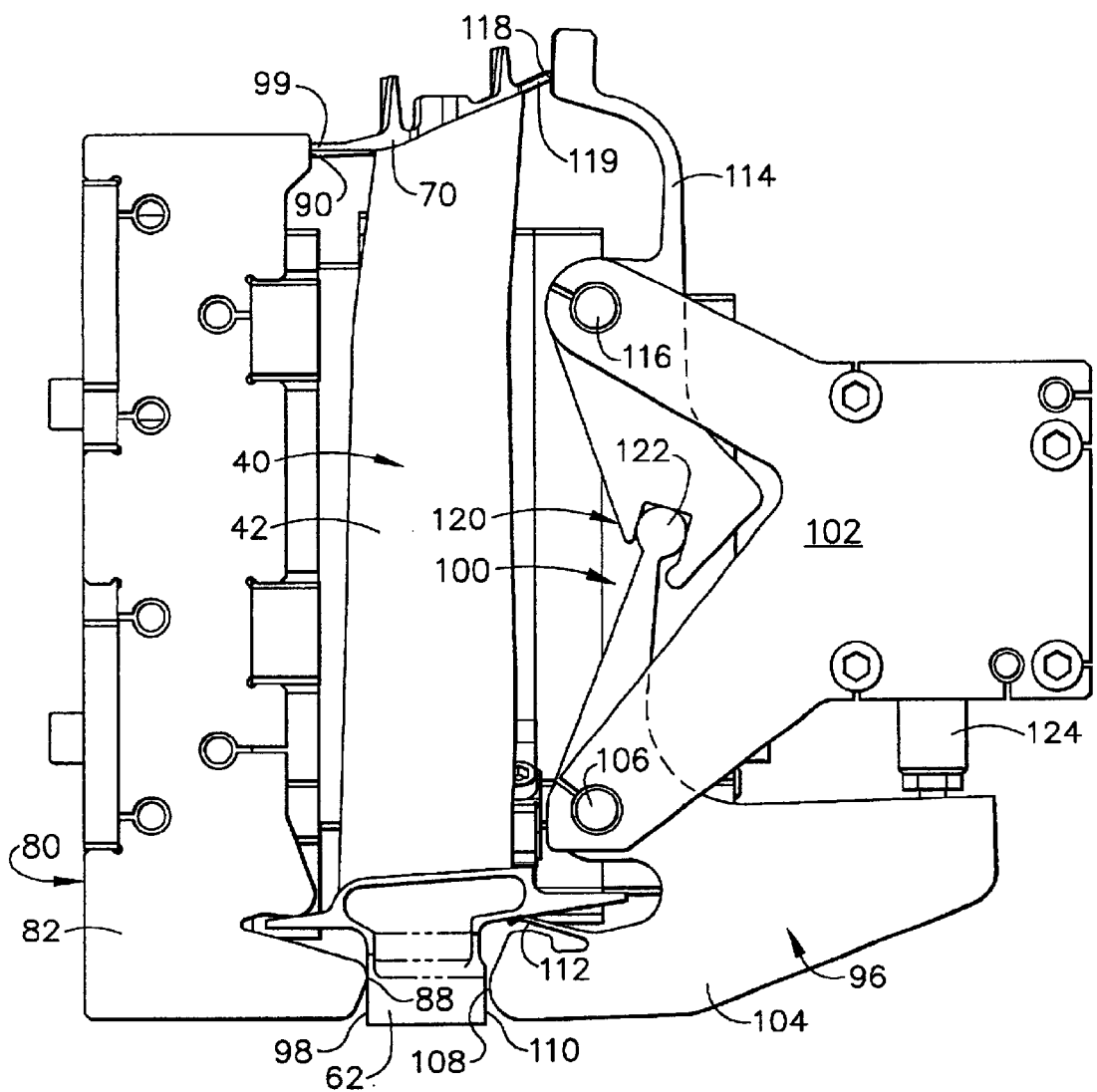
FIG. 5 is a top view of the turbine blade mounted in the fixture, with the clamp arms in the unclamped position.
Figure 6:
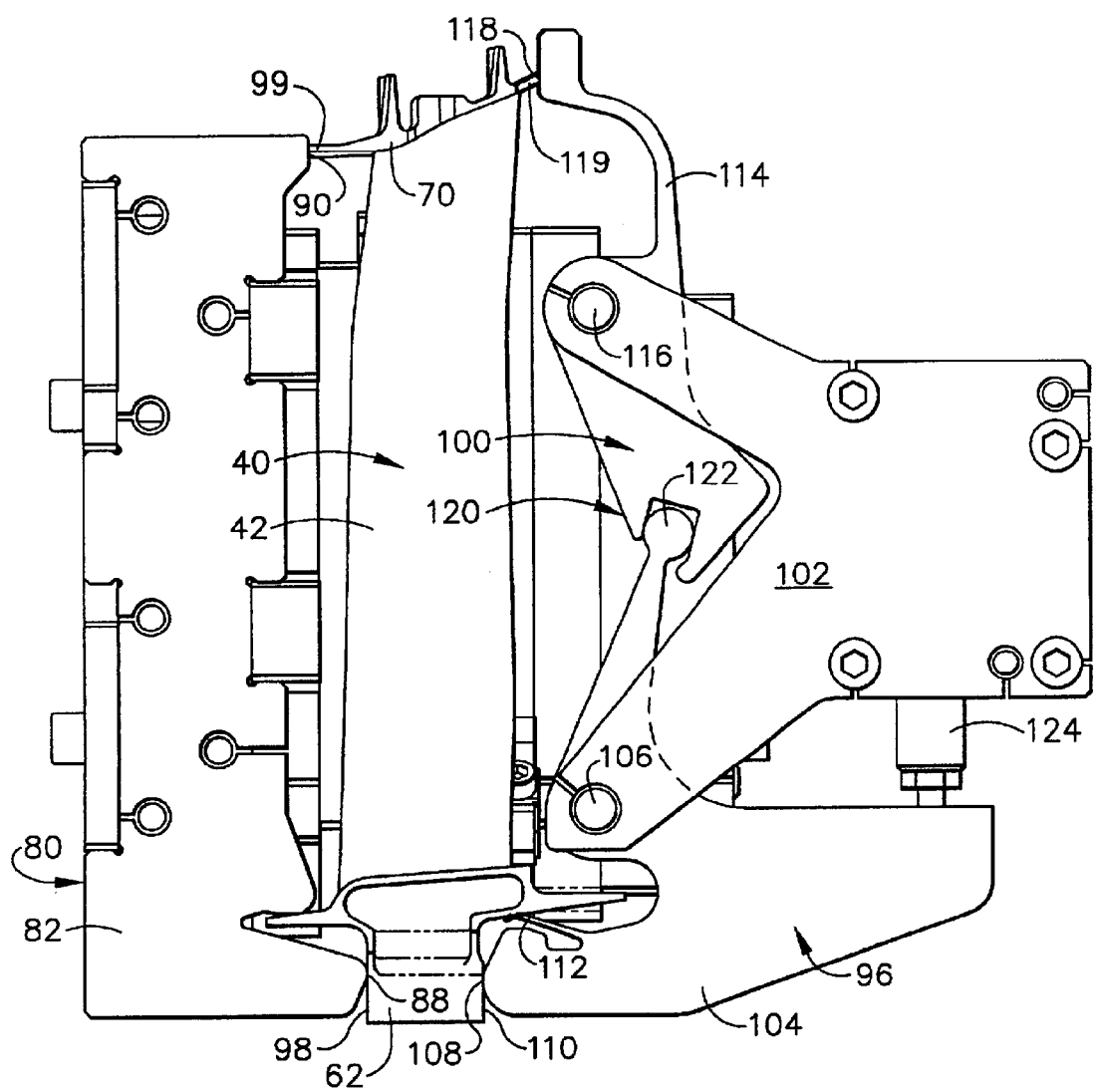
FIG. 6 is a top view of the turbine blade mounted in the fixture, as in FIG. 5, but with the clamp arms in the clamped position.
Figure 7:
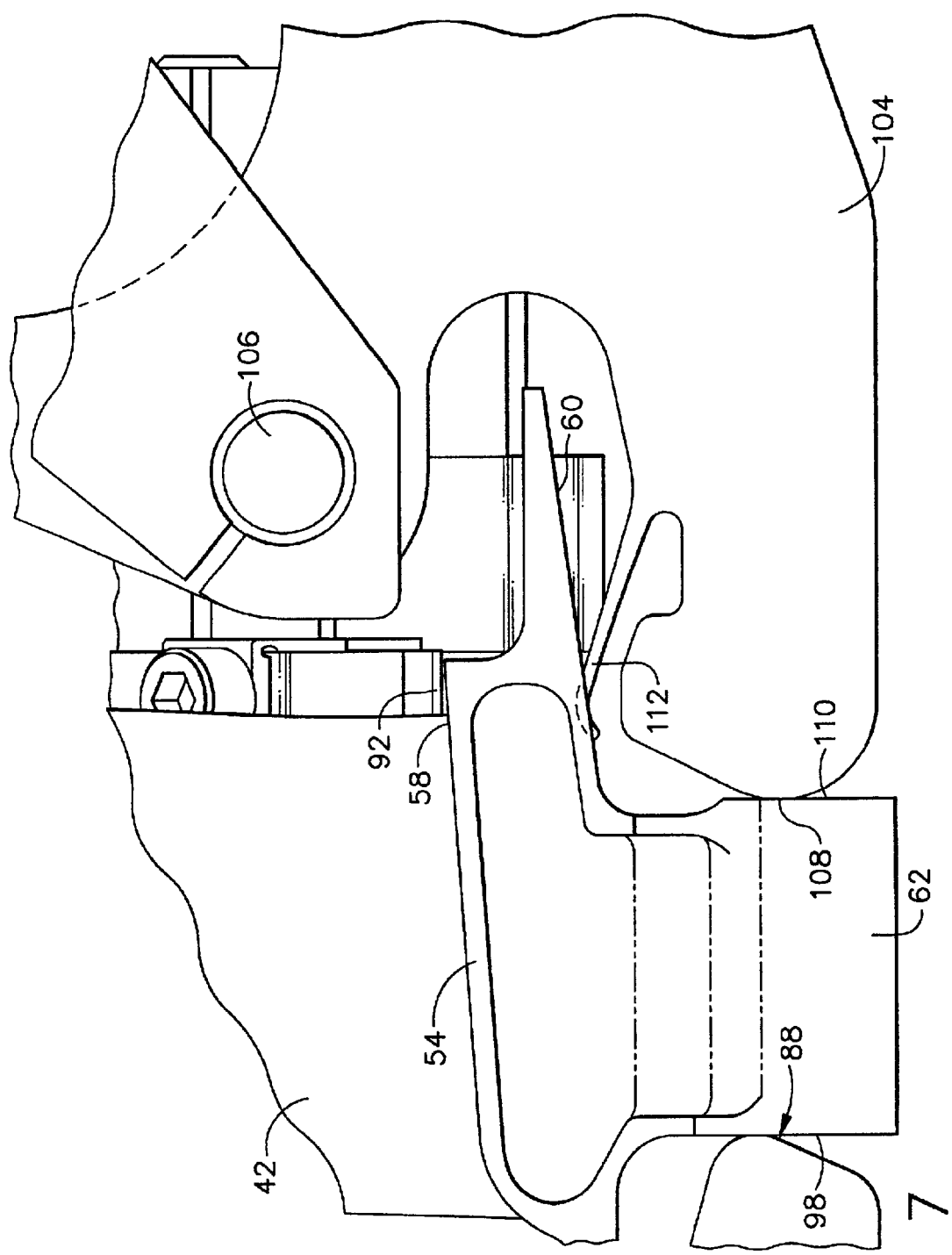
FIG. 7 is a detail of FIG. 6, showing the z-positioning spring.

To accomplish this simultaneous clamping of the gas turbine component blank 40 against the y-axis datum locator 86 and the z-axis datum locator 92, the clamp 96 preferably includes a compound mechanical movement 100, most easily seen in FIG. 4, that simultaneously forces the gas turbine component blank against the y-axis datum locator 86 and the z-axis datum locator 92 when the clamp 96 is moved from the unclamped position of FIG. 5 to the clamped position of FIG. 6. A preferred form of the compound mechanical movement 100 comprises an asymmetric Y-shaped yoke 102 that is connected to the base 82.

A first link 104 is pivotably connected to one arm of the yoke 102 at a first pivot point 106, which is pivotably connected to the base 82. A contact region 108 of the first link 104 contacts to a second end 110 of the root precursor 62 when the clamp is in the clamped position, so as to force the first end 98 of the root precursor 62 against the first y-axis stop 88 with a hard metal-to-metal contact. The first link 104 further includes a z-positioning spring 112, preferably in the form of a leaf spring integral with the first link 104, contacting the bottom side 60 of the platform 54 when the clamp 96 is in the clamped position to force the top side 58 of the platform 54 against the z-axis datum locator 92. This contacting is shown in detail in FIG. 7.

A second link 114 is pivotably connected to the other arm of the yoke 102 at a second pivot point 116, which is pivotably connected to the base 82. A contact region 118 of the second link 114 contacts to a second end 119 of the rotating shroud 70, which is oppositely disposed to the first end 99, when the clamp 96 is in the clamped position of FIG. 5, so as to force the first end 99 of the rotating shroud 70 against the second y-axis stop 90. The contact region 118 preferably comprises a spring in the form of a leaf spring. The first link 104 has a sliding and pivoting interconnection 120 to the second link 114. The sliding and pivoting interconnection 120 preferably comprises a mechanical knuckle 122.

An hydraulic actuator 124 is operable to move the clamp 96 between the unclamped position of FIG. 5 and the clamped position of FIG. 6. The hydraulic actuator 124, which preferably is a liquid-driven actuator to generate a large clamping force but may be a gas-driven pneumatic actuator, desirably controllably generates a force between the base 82 and in this case one side of the yoke 102, on the one hand, and the first link 104 to cause the first link 104 to pivot about the first pivot point 106, on the other hand. The second link 114, through the movement of the interconnection 120, responsively pivots about the second pivot point 116. Thus, movement of the single hydraulic actuator 124 generates all of the clamping movements and forces required to clamp the gas turbine component blank 40 in the fixture 80.

To use the fixture 80, the hydraulic actuator 124 is retracted so that the first link 104 pivots (counterclockwise in FIG. 4) and the second link 114 pivots (clockwise in FIG. 4) to the unclamped, open position of FIG. 5. The gas turbine component blank 40 is placed into the fixture 80 so that the gas turbine component blank 40 rests upon and is supported by the x-axis datum locator 84, numeral 24. The hydraulic actuator 124 is then operated and extended so that the first link 104 pivots (clockwise in FIG. 4) and the second link 114 pivots (counterclockwise in FIG. 4) to the clamped position of FIG. 6. As the links 104 and 114 pivot to the clamped position, three clamping actions occur. First, the z-positioning spring 112 contacts the bottom side 60 of the platform 54 and forces the gas turbine component blank 40 upwardly so that the top side 58 of the platform 54 is resiliently clamped against the z-axis datum locator 92. Second, the contact region 118 of the second link 114 contacts the second end 119 of the rotating shroud 70 and forces the rotating shroud 70 along the y-axis 46 (in the negative y direction) so that the first end 99 of the rotating shroud 70 is resiliently clamped against the second y-axis stop 90. A resilient clamping of the gas turbine component blank 40 against the z-axis datum locator 92 and the second y-axis stop 90 is sufficient because relatively small forces are applied through these locations during subsequent shaping of the gas turbine component blank 40. Third, the contact region 108 contacts the second end 110 of the root precursor 62 and forces the first end 98 of the root precursor 62 hard (non resiliently) against the first y-axis stop 88. The root precursor 62 is thus clamped held tightly and securely, with hard metal-to-metal contacts, between the first y-axis stop 88 and the contact region 108 of the first link 104. This hard, metal-to-metal clamping of the root precursor 62 along the y-axis 46 resists the shaping (grinding) forces produced during the subsequent shaping operation.

Once the gas turbine component blank 40 is clamped into the fixture 80, the gas turbine component blank 40 is shaped, numeral 28 of FIG. 1. The shaping using the fixture 80 is preferably the shaping of the sides 66 of the root precursor 62 to define the dovetail form required to affix the final root, and thence the completed turbine blade, to the turbine disk in the gas turbine engine. The shaping 28 is accomplished by any operable approach, but preferably grinding using a creep feed grinder and grinding technique is used. The grinding direction is generally parallel to the y-axis 46, which is the reason that the secure metal-to-metal clamping of the root between the first y-axis stop 88 and the contact region 108 is required. The creep feed grinder takes relatively large bites of material with each pass, typically on the order of 0.20 inches per pass, and the grinding tool moves rapidly with respect to the root precursor 62, typically on the order of 45 inches per minute. The forces transmitted to the root precursor 62 and thence to the gas turbine component blank 40, and the vibrations potentially introduced into the gas turbine component blank 40, by the creep feed grinder are therefore relatively large. The root precursor 62 must therefore be clamped very securely by the fixture 80 against movement of the root precursor 62 in the y-direction 46, and the present fixture 80 provides that secure support of the gas turbine component blank 40. During grinding, a liquid coolant/lubricant is forced around the area of the root precursor 62 being ground. The fixture 80 serves to channel and direct the flow of the coolant/lubricant to the exact location where the grinding tool is contacting the metal of the root precursor 62, improving the cooling and lubrication of the root precursor 62.

After the shaping 28 is complete, the hydraulic actuator 24 is retracted to move the clamp 96 to the unclamped position, and the gas turbine component blank 40 is removed from the fixture 80, numeral 30. The gas turbine component blank 40 is thereafter further processed, numeral 32, for any of several reasons and by any of several approaches. There may be further shaping of the root precursor 62, as for example to shape the tang 68. There may be coating of the airfoil 50 with protective coatings. Other further processing may be used as desired.

The present approach of FIG. 1 has been practiced using prototype fixturing 80 and found to be fully operable. The clamping of the root precursor 62 in the fixture 80 was found to be more secure and rigid than when the metal encapsulation approach is used, allowing faster grinding rates.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A fixture used in conjunction with a gas turbine component blank having an orthogonal reference system including an x-axis, a y-axis, and a z-axis, the gas turbine component blank comprising an elongated airfoil extending generally parallel to the z-axis and having an airfoil face, a platform extending transversely to the z-axis at a first end of the airfoil, the platform having a top side adjacent to the airfoil and a bottom side oppositely disposed from the top side, a root precursor at the first end of the airfoil and extending away from the airfoil along the z-axis, wherein the root precursor has a pair of oppositely disposed ends lying perpendicular to the y-axis, and a pair of sides, and a rotating shroud at a second end of the airfoil extending transversely to the z-axis and along the y-axis, the fixture comprising:

a base upon which a remainder of the fixture is supported, the base having an x-axis datum locator, a y-axis datum locator including a first y-axis stop and a second y-axis stop, and a z-axis datum locator, wherein the x-axis datum locator is positioned to receive the gas turbine component blank thereon with the airfoil face in a generally facing relationship to the base; and a clamp movable between
an unclamped position in which the gas turbine component blank may be inserted onto the x-axis datum locator of the base, and
a clamped position wherein the clamp simultaneously forces a first end of the root precursor against the first y-axis stop, the rotating shroud against the second y-axis stop, and the gas turbine component blank against the z-axis datum locator.

2. The fixture of claim 1, wherein the clamp comprises
a compound mechanical movement that simultaneously forces the gas turbine component blank against the y-axis datum locator and the z-axis datum locator when the clamp is moved from the unclamped position to the clamped position.

3. The fixture of claim 1, wherein the clamp comprises
a first link pivotably connected to the base and contacting to the root precursor and to the platform when the clamp is in the clamped position, so as to force the first end of the root precursor against the first y-axis stop and to force the platform against the z-axis datum locator, and
a second link pivotably connected to the base and contacting to the rotating shroud when the clamp is in the clamped position, so as to force the rotating shroud against the second y-axis stop, the first link having a sliding and pivoting interconnection to the second link.

4. The fixture of claim 3, wherein the first link includes a z-positioning spring contacting the bottom side of the platform when the clamp is in the clamped position to force the top side of the platform against the z-axis datum locator.

5. The fixture of claim 3, wherein the sliding and pivoting interconnection comprises a mechanical knuckle.

6. The fixture of claim 1, further including
an hydraulic actuator operable to move the clamp between the unclamped position and the clamped position.

7. A fixture used in conjunction with a gas turbine component blank the gas turbine component blank comprising an airfoil having a direction of elongation, a platform extending transversely to the airfoil and having a top side adjacent to the airfoil and a bottom side oppositely disposed from the top side, a root precursor at the first end of the airfoil and extending away from the airfoil, wherein the root precursor has a pair of oppositely disposed ends, and a pair of sides, and a rotating shroud at a second end of the airfoil and extending transversely to the airfoil, the fixture comprising:

a base lying in a base plane and having a datum locator, the datum locator including
an x-axis datum locator upon which the gas turbine component blank is supported so that the direction of elongation of the airfoil is generally parallel to the base plane, the x-axis datum locator preventing movement of the gas turbine component blank perpendicular to the base plane,
a y-axis datum locator comprising a first y-axis stop and a second y-axis stop, wherein the first y-axis stop is contacted by a first one of the ends of the root precursor and the second y-axis stop is contacted by the rotating shroud, and
a z-axis datum locator that is contacted by the gas turbine component blank and which prevents movement of the gas turbine component blank parallel to the direction of elongation of the airfoil; and a clamp movable between
an unclamped position in which the gas turbine component blank may be inserted onto the x-axis datum locator of the base, and
a clamped position wherein the clamp simultaneously forces the first end of the root precursor against the first y-axis stop, the rotating shroud against the second y-axis stop, and the gas turbine component blank against the z-axis datum locator.

8. The fixture of claim 7, wherein the clamp comprises
a compound mechanical movement that simultaneously forces the gas turbine component blank against the y-axis datum locator and the z-axis datum locator when the clamp is moved from the unclamped position to the clamped position.

9. The fixture of claim 7, wherein the clamp comprises
a first link pivotably connected to the base and contacting to the root precursor and to the platform when the clamp is in the clamped position, so as to force the first end of the of the root precursor against the first y-axis stop and to force the platform against the z-axis datum locator, and
a second link pivotably connected to the base and contacting to the rotating shroud when the clamp is in the clamped position, so as to force the rotating shroud against the second y-axis stop, the first link having a sliding and pivoting interconnection to the second link.

10. The fixture of claim 9, wherein the first link includes a z-positioning spring contacting the bottom side of the platform when the clamp is in the clamped position to force the top side of the platform against the z-axis datum locator.

11. The fixture of claim 9, wherein the sliding and pivoting interconnection comprises a mechanical knuckle.

12. The fixture of claim 7, further including
an hydraulic actuator operable to move the clamp between the unclamped position and the clamped position.

13. A fixture used in conjunction with a gas turbine component blank having an airfoil, a root precursor at a first end of the airfoil, and a rotating shroud at a second end of the airfoil, the fixture comprising:
a base lying in a base plane and having a datum locator, the datum locator including
an x-axis datum locator upon which the gas turbine component blank is supported to prevent movement of the gas turbine component blank perpendicular to the base plane,
a y-axis datum locator comprising a first y-axis stop and a second y-axis stop, the y-axis datum locator preventing movement of the gas turbine component blank in a first direction lying in the base plane, and
a z-axis datum locator that prevents movement of the gas turbine component blank in a second direction orthogonal to the first direction and lying in the base plane; and
a clamp movable between
an unclamped position in which the gas turbine component blank may be inserted onto the x-axis datum locator of the base, and
a clamped position wherein the clamp simultaneously forces the root precursor against the first y-axis stop, the rotating shroud against the second y-axis stop, and the gas turbine component blank against the z-axis datum locator.

14. The fixture of claim 13, wherein the clamp comprises a compound mechanical movement that simultaneously forces the gas turbine component blank against the y-axis datum locator and the z-axis datum locator when the clamp is moved from the unclamped position to the clamped position.

15. The fixture of claim 13, wherein the clamp comprises
a first link pivotably connected to the base and contacting to the root precursor and to the platform when the clamp is in the clamped position, so as to force the first end of the root precursor against the first y-axis stop and to force the platform against the z-axis datum locator, and
a second link pivotably connected to the base and contacting to the rotating shroud when the clamp is in the clamped position, so as to force the rotating shroud against the second y-axis stop, the first link having a sliding and pivoting interconnection to the second link.

16. The fixture of claim 15, wherein the first link includes a z-positioning spring contacting the bottom side of the platform when the clamp is in the clamped position to force the top side of the platform against the z-axis datum locator.

17. The fixture of claim 15, wherein the sliding and pivoting interconnection comprises a mechanical knuckle.

18. The fixture of claim 13, further including
an hydraulic actuator operable to move the clamp between the unclamped position and the clamped position.

19. A method for shaping a gas turbine component blank, the gas turbine component blank comprising
an airfoil having a direction of elongation,
a platform extending transversely to the airfoil and having a top side adjacent to the airfoil and a bottom side oppositely disposed from the top side,
a root precursor at the first end of the airfoil and extending away from the airfoil, wherein the root precursor has a pair of oppositely disposed ends, and a pair of sides, and
a rotating shroud at a second end of the airfoil and extending transversely to the airfoil, the method including the steps of
providing a fixture comprising
a base lying in a base plane and having a datum locator, the datum locator including
an x-axis datum locator upon which the gas turbine component blank is supported so that the direction of elongation of the airfoil is generally parallel to the base plane, the x-axis datum locator preventing movement of the gas turbine component blank perpendicular to the base plane,
a y-axis datum locator comprising a first y-axis stop and a second y-axis stop, wherein the first y-axis stop is contacted by a first one of the ends of the root precursor and the second y-axis stop is contacted by the rotating shroud,
a z-axis datum locator that is contacted by the gas turbine component blank and which prevents movement of the gas turbine component blank parallel to the direction of elongation of the airfoil;
a clamp movable between
an unclamped position in which the gas turbine component blank may be inserted onto the x-axis datum locator of the base, and
a clamped position wherein the clamp simultaneously forces the first end of the root precursor against the first y-axis stop, the rotating shroud against the second y-axis stop, and the gas turbine component blank against the z-axis datum locator; thereafter
placing the gas turbine component blank into the fixture with the clamp in the unclamped position; thereafter
operating the clamp to move the clamp to the clamped position; and thereafter shaping the gas turbine component blank.

20. The method of claim 19, wherein the step of providing the fixture includes the step of providing the clamp comprising
a compound mechanical movement that simultaneously forces the gas turbine component blank against the y-axis datum locator and the z-axis datum locator when the clamp is moved from the unclamped position to the clamped position.

21. The method of claim 19, wherein the step of providing the fixture includes the step of providing the clamp comprising
a first link pivotably connected to the base and contacting to the root precursor and to the platform when the clamp is in the clamped position, so as to force the first end of the root precursor against the first y-axis stop and to force the platform against the z-axis datum locator, and
a second link pivotably connected to the base and contacting to the rotating shroud when the clamp is in the clamped position, so as to force the rotating shroud against the second y-axis stop, the first link having a sliding and pivoting interconnection to the second link.

22. The method of claim 21, wherein the step of providing the fixture includes the step of providing the clamp comprising the first link including a z-positioning spring contacting the bottom side of the platform when the clamp is in the clamped position to force the top side of the platform against the z-axis datum locator.

23. The method of claim 21, wherein the step of providing the fixture includes the step of providing the clamp comprising the sliding and pivoting interconnection comprising a mechanical knuckle.

24. The method of claim 19, wherein the step of providing the fixture includes the step of providing the clamp comprising an hydraulic actuator operable to move the clamp between the unclamped position and the clamped position.

25. The method of claim 19, wherein the step of shaping includes the step of shaping the sides of the root precursor into the dovetail form.

26. The method of claim 19, wherein the step of shaping includes the step of grinding the sides of the root precursor into the dovetail form.

\* \* \* \* \*

UNITED STATES PATENT AND TRADEMARK OFFICE
CERTIFICATE OF CORRECTION

PATENT NO. : 6,855,033 B2 Page 1 of 1
DATED : February 15, 2005
INVENTOR(S) : Jones et al.

It is certified that error appears in the above-identified patent and that said Letters Patent is hereby corrected as shown below:

Column 8,
Line 5, "blank the" should be -- blank, the --.

Signed and Sealed this

Thirtieth Day of August, 2005

JON W. DUDAS
*Director of the United States Patent and Trademark Office*